United States Patent [19]

Lievens et al.

[11] Patent Number: 5,220,799
[45] Date of Patent: Jun. 22, 1993

[54] GASOLINE VAPOR RECOVERY

[76] Inventors: Geert Lievens, 2648 Ellwoor Dr. NE., Atlanta, Ga. 30305; Tedmund P. Tiberi, P.O. Box 184, Nashua, N.H. 03061

[21] Appl. No.: 803,590

[22] Filed: Dec. 9, 1991

[51] Int. Cl.$^5$ ............................................. F17C3/10
[52] U.S. Cl. ..................................... 62/48.2; 55/88; 220/88.3
[58] Field of Search .................... 62/48.2; 55/88; 220/88.3

[56] References Cited

U.S. PATENT DOCUMENTS

| | | | |
|---|---|---|---|
| 2,889,955 | 6/1959 | Naulty et al. | 220/88.3 |
| 3,691,730 | 9/1972 | Hickey et al. | 220/88.3 |
| 3,710,549 | 1/1973 | Nichols et al. | 220/88.3 |
| 3,717,006 | 2/1973 | Kimmel et al. | 62/48.2 |
| 4,671,071 | 6/1987 | Sasaki | 62/48.2 |

Primary Examiner—Ronald C. Capossela
Attorney, Agent, or Firm—Hopkins & Thomas

[57] ABSTRACT

A process for reclaiming and recycling gasoline vapor that collects in the headspace of gasoline storage tanks at retail service stations comprises sealing the tank against ingress of atmospheric gases, introducing a selected inert gas into the storage tank as the liquid gasoline is extracted therefrom to establish an inert gas/gasoline vapor mixture in the headspace of the storage tank, periodically recovering the inert gas/gasoline vapor mixture from the storage tank, and processing the recovered mixture to condense the gasoline vapor to liquid gasoline, which is removed for subsequent use.

17 Claims, 2 Drawing Sheets

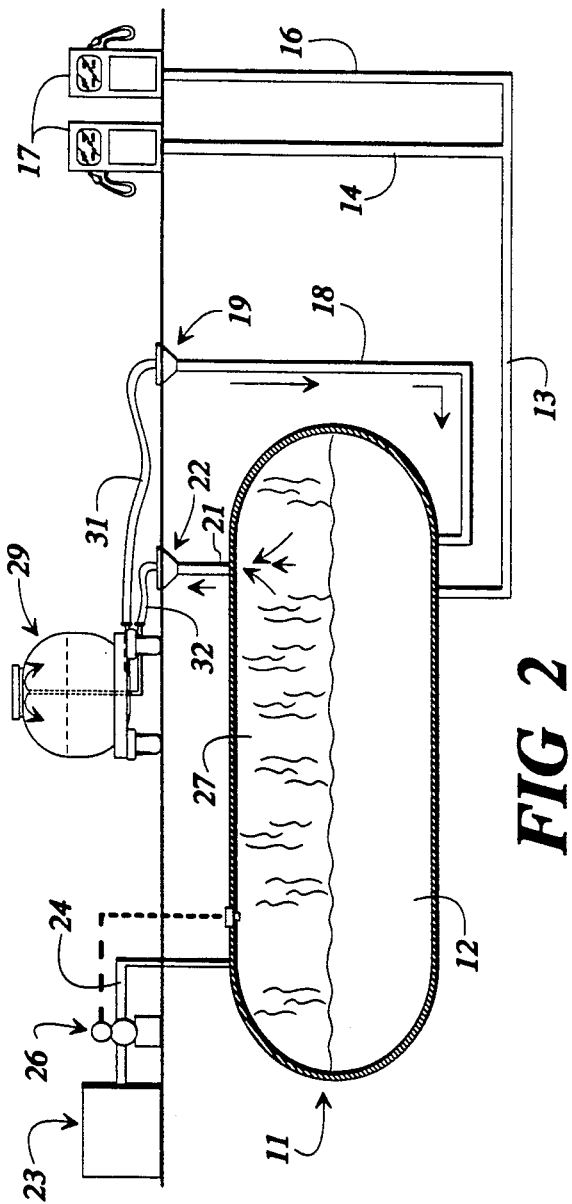
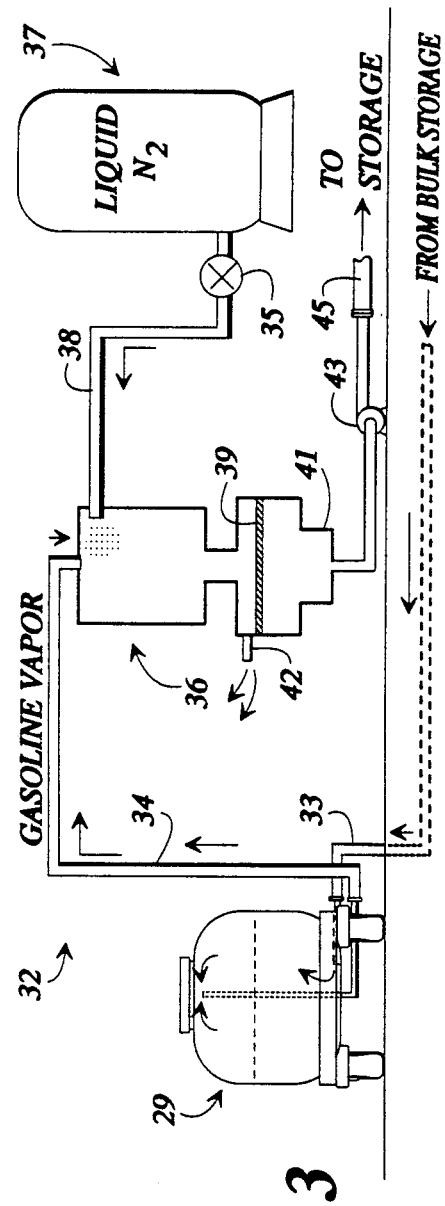

GASOLINE VAPOR RECOVERY

TECHNICAL FIELD

The present invention relates generally to the commercial distribution and processing of gasoline and more specifically to methods of recovering liquid gasoline from gasoline vapor that collects in the head space of a gasoline storage tank.

BACKGROUND OF THE INVENTION

When dispensing gasoline to the tanks of individual vehicles at a retail service station, the gasoline typically is pumped from large storage tanks, which are often located underground. Such storage tanks, in turn, are refilled periodically from tanker trucks, which receive gasoline at a central distribution site and deliver it to individual service stations where it is pumped from the truck into the underground storage tanks.

Gasoline storage tanks at retail service stations typically are vented to the atmosphere so that air can be drawn into the tank to displace liquid gasoline as it is pumped from the tank and into the gas tanks of vehicles. As a result, the head space within the storage tank, i.e. the space above the surface of liquid gasoline in the tank, is progressively filled as the tank is emptied with a mixture of oxygen, nitrogen, and water vapor from the atmosphere, and highly concentrated gasoline vapor, which evaporates from the surface of liquid gasoline within the tank.

In the past, the gases and vapors within the head space of gasoline storage tanks was simply re-vented into the atmosphere each time the storage tank was filled from a tanker truck. In recent years, however, environmental concerns have lead to requirements that head space vapors within gasoline storage tanks be recovered when the tanks are refilled to prevent introduction of the gasoline vapors into the atmosphere. Usually, such vapors are simply directed through a recovery conduit into the head space of the tanker truck as liquid gasoline from the tanker truck is pumped into the storage tank. When the tanker truck has depleted its load of liquid gasoline and is filled with head space vapors collected from the storage tanks that were serviced, the tanker truck returns to the central distribution station or to a processing station. Here, the concentrated vaporous mixture is retrieved from the tanker truck for further processing.

In some instances, the retrieved vaporous mixture is simply burned to minimize the impact of its release into the atmosphere. In many instances, however, the vaporous mixture is processed to condense the gasoline vapor to liquid gasoline and thus recover the liquid gasoline from the mixture. The recovered liquid gasoline can then be redistributed to individual service stations for sale.

Various techniques are available for recovering the gasoline vapor from such mixtures. Carbon adsorption regeneration and mechanical refrigeration techniques typically involve cooling the mixture to a temperature below the condensation point of gasoline, whereby the gasoline vapor condenses into liquid gasoline which can be collected for redistribution. One such gasoline recovery system is illustrated and discussed in an article by A. H. Hall entitled "Operational Experience of the BOC Liquid Nitrogen Condensation Vapour Recovery Unit".

Although liquid gasoline recovery systems have been somewhat successful in recovering gasoline from vaporous mixtures, they nevertheless have been plagued with numerous problems and shortcomings. For example, vapor mixtures recovered from gasoline storage tanks commonly include high concentrations of water vapor and oxygen from the atmosphere. Since water vapor has a much higher condensation temperature than gasoline, it tends to condense out of the mixture long before condensation of gasoline begins to occur. As a consequence, prior art recovery systems typically include a pre-cooler wherein the mixture is pre-cooled to a temperature between the condensation points of water and gasoline in an attempt to condense the water out of the mixture. The precondensed water is then collected and drained from the system before the condensation of gasoline is commenced. In addition, carbon adsorption recovery systems suffer from reduced efficiency due to active molecular adsorption sites being occupied by water vapor instead of hydrocarbon material.

Even with such pre-cooling, some water vapor remains in the mixture. As a result, during further cooling of the mixture to condense the gasoline vapor, this water freezes and the resulting small ice crystals tend to destroy the pumps, seals, and valves of the system. Furthermore, when the condensed gasoline returns to normal temperatures, the ice crystals melt and mix with the gasoline, thus reducing the quality of the gasoline condensate and requiring further gravity separation techniques. Also, the condensation of water vapor from the mixture requires energy, which otherwise might be used in condensing the gasoline vapor itself.

In addition to problems associated with water vapor in the mixture, oxygen in the mixture can also cause problems. When liquid nitrogen is used as a condensing coolant, for example, there is a risk that the oxygen within the mixture will undergo a phase change to its liquid state. Naturally, intimate contact between highly volatile gasoline and liquid oxygen can create an extremely dangerous explosive condition. In addition, the mere presence of oxygen gas in the initial vapor mixture creates a potential for explosion that must be seriously considered when designing tanker trucks and processing equipment.

Accordingly, a continuing and heretofore unaddressed need exists for a gasoline vapor recovery methodology wherein the above discussed problems associated with water vapor and oxygen in the mixture are eliminated, where energy is not wasted condensing water out of the mixture, and wherein high quality liquid gasoline is recovered from the mixture economically and with minimum system complexity. It is to the provision of such a methodology that the present invention is primarily directed.

SUMMARY OF THE INVENTION

Briefly described, the present invention, in one preferred embodiment thereof, comprises a method of recovering gasoline vapor from gasoline storage tanks at retail service stations and processing the recovered vapor to condense it economically back to a high quality liquid gasoline. The method includes providing a source of inert gas such as nitrogen at the location of the storage tank. The inert gas source is coupled through an appropriate regulator system for delivery of the inert gas to the head space of the gasoline storage tank to displace liquid gasoline as it is pumped from the tank into individual automobiles. The normal vent to the atmosphere is eliminated such that the storage tank becomes a closed system sealed off from the atmosphere.

As liquid gasoline is pumped from the tank into individual vehicles, the regulator system senses a pressure drop in the head space of the tank and injects into the head space sufficient inert gas to maintain the pressure slightly above that of the atmosphere. The inert gas within the head space of the storage tank quickly becomes saturated with gasoline vapor that evaporates from the surface of liquid gasoline in the tank. As a consequence, the head space of the storage tank is progressively filled not with oxygen, water vapor, and gasoline vapor, but rather with concentrated gasoline vapor and inert, preferably nitrogen, gas.

When the storage tank is refilled from a tanker truck, liquid gasoline displaces the mixture in the tank's head space, which in turn is collected in the head space of the tanker truck. When the tanker has been drained of its liquid gasoline load and is filled with collected inert gas/gasoline vapor mixture, it returns to a central distribution or processing center, where the inert gas/gasoline vapor mixture within the tanker truck is delivered directly to a recovery unit. There, the mixture is cooled to a low temperature to condense the gasoline vapor back to liquid gasoline, or the vapor is first adsorbed into activated carbon, subsequently desorbed, and then condensed.

Since the mixture contains no water vapor, all problems associated with the formation of ice crystals are eliminated. Further, the need for a pre-cooling stage to condense the water from the mixture is eliminated as is the energy waste associated with such a pre-cooler. Also, since the initial mixture preferably contains only an inert non-oxidizing gas and gasoline vapor, the safety of the entire system is greatly increased. Finally, since an appropriately chosen inert gas such as nitrogen has a boiling point lower than that of gasoline vapor, no residual condensate is left with the recondensed liquid gasoline. As a result, the recovered liquid gasoline is a high quality product that can be sold at higher prices.

It is thus an object of this invention to provide a gasoline vapor recovery methodology wherein problems associated with water vapor in the initial mixture are eliminated.

Another object of the invention is to provide a gasoline vapor recovery methodology wherein liquid gasoline is recovered efficiently and economically.

A further object of the invention is to provide a gasoline vapor recovery methodology that results in higher quality liquid gasoline condensate than prior art systems.

An additional object of the invention is to provide a gasoline vapor recovery methodology that is safer than prior art systems since intimate mixing of oxygen and gasoline is eliminated.

Another object of the invention is to provide a method of recovering and reusing gasoline vapors and thus preventing release of such vapors into the atmosphere.

These and other objects, features, and advantages of the present invention will become more apparent upon review of the following detailed description taken in conjunction with the accompanying drawings.

BRIEF DESCRIPTION OF THE DRAWINGS

FIG. 2 is a diagrammatic illustration showing recovery of inert gas/gasoline vapor from the head space of a storage tank at a retail gasoline outlet.

FIG. 3 is a diagrammatic illustration showing processing of the recovered inert gas/gasoline vapor mixture to extract usable liquid gasoline therefrom.

DETAILED DESCRIPTION OF THE PREFERRED EMBODIMENT

Figure 1:
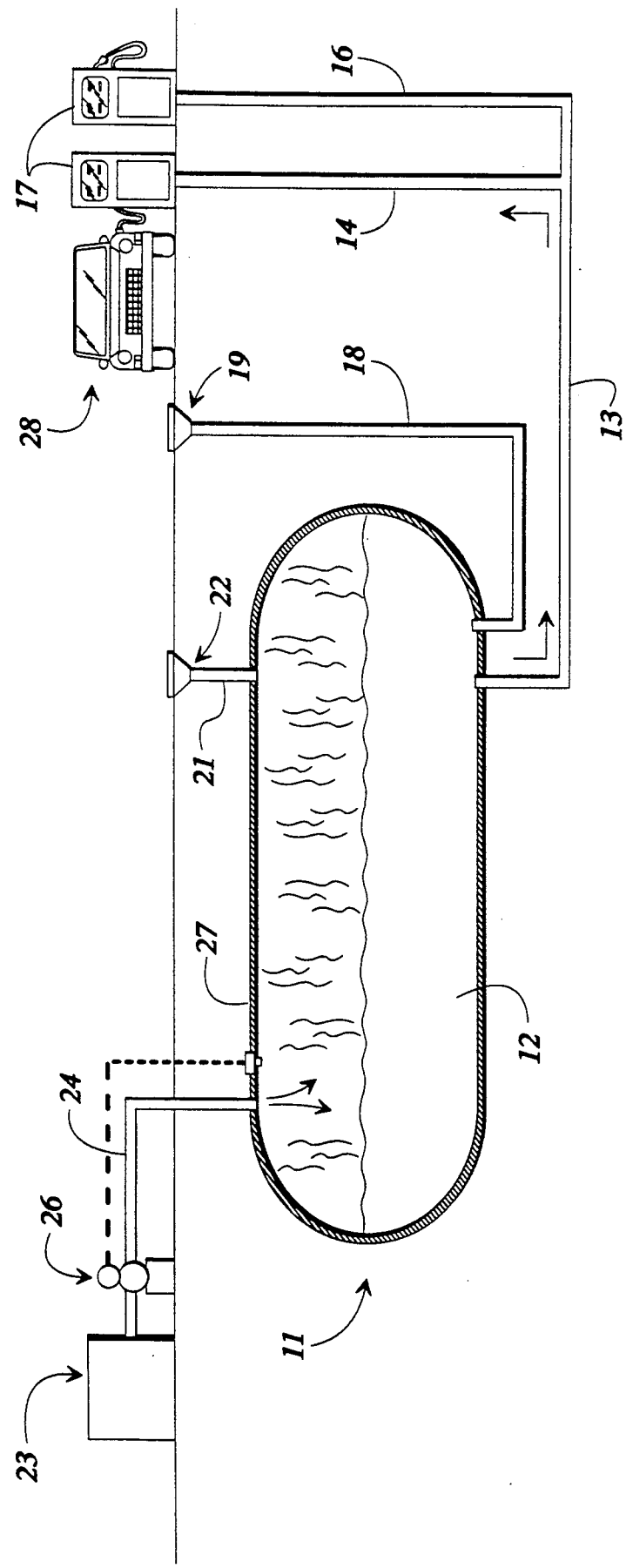
FIG. 1 is a diagrammatic illustration showing normal operation of the present invention at a retail gasoline outlet.

Referring now in more detail to the drawings, in which like numerals refer to like parts throughout the several views, FIG. 1 illustrates a portion of the methodology of the present invention in a simplified diagrammatic form. More specifically, FIG. 1 illustrates application of the invention at a retail gasoline outlet where gasoline is pumped from a storage tank into individual automobiles. The gasoline storage tank 11 is seen to be located underground; however, such storage tanks are often found above ground and the present invention extends to such above ground tanks as well as to underground tanks.

The storage tank 11 is partially filled with gasoline 12 and is coupled through conduits 13, 14, and 16 to a pair of retail gasoline pumps 17 Obviously, while two gasoline pumps 17 are shown for illustration, any number of pumps might well be coupled to the storage tank for drawing gasoline therefrom.

The gasoline storage tank 11 is also coupled through a conduit 18 to a fill-valve 19 through which the storage tank 11 can be refilled with liquid gasoline from a gasoline tanker truck (FIG. 2) Both conduits 13 and 18 are seen to be coupled to the storage tank at its bottom for drawing liquid gasoline from the tank and refilling the tank with liquid gasoline respectively. The tank 11 also communicates at its upper portion through a recovery conduit 21 with a gaseous recovery valve 22, through which gas and vapor collected in the head space of tank 11 can be recovered by the tanker truck during the refilling operation.

A source of inert gas 23 is located in the vicinity of the storage tank 11 and communicates therewith through a conduit 24 and through a back pressure regulator valve 26. The back pressure regulator valve 26 controls the flow of inert gas from the source 23 into the head space 27 of the gasoline storage tank 11 in response to specific conditions within the head space. More specifically, the back pressure regulator valve 26 is adapted to sense a pressure drop in the head space of the storage tank as liquid gasoline is pumped from the tank and, in response, to inject inert gas from the source 23 into the head space 27 until the pressure rises above a pre-determined value. Preferably, the pre-determined value of pressure within the head space of the storage tank is chosen to be slightly above ambient atmospheric pressure. In this way, any leaks in valves 19 or 22 or anywhere else in the system will result in a slight out-gassing from the head space of the storage tank rather than an in-flow of atmospheric gases and water vapor into the tank.

While inert gas from the source 23 might be chosen to be any of a number of suitable gases, it is important that the selected gas be free of any water vapor that might be introduced along with the gas into the head space of the storage tank. In this regard, nitrogen gas has been found to be desirable because of its lack of water vapor and further because the nitrogen molecules do not interact readily with the gasoline or gasoline vapor within the storage tank 11. Nevertheless, numerous other gases such as helium, argon, or the like might also be used with comparable results. Furthermore, even dry atmospheric gases, which have been scrubbed of their moisture content, might even be used as an inert gas even though atmospheric gases contain oxygen and other trace elements. Consequently, the term "inert" as used throughout the specification and claims hereof does not necessarily limit the present invention to use of a chemically inert gas and should be understood to include dry atmospheric gas as well as nitrogen, helium, argon, and other chemically inert gasses and gaseous mixtures.

The source of inert gas itself might also be selected from a number of viable options. These options include small or large bulk cryogenic liquid storage tanks, high or low pressure gas phase cylinders, or on-sight generating equipment utilizing membrane or pressure swing adsorption technologies. Further, if dry atmospheric gases are selected as the inert gas, various methods of stripping the atmospheric gases of their water vapor, such as, for example, absorption, silica gel, desiccant, or membrane methodologies might be used. The back flow regulator 26, which controls the flow of gas into the storage tank, is available from a number of manufacturers such as Anderson-Greenwood, and is adapted to maintain a slight positive pressure in the head space of the storage tank as discussed above.

One of the gasoline pumps 17 is seen in FIG. 1 to be drawing liquid gasoline from the storage tank 11 through conduits 13 and 14 and delivering the gasoline to the gasoline tank of an automobile 28. As gasoline is delivered to the tank of the car, the level of gasoline 12 in the storage tank 11 falls slightly. This causes the pressure in the head space of the tank to fall as well. When the head space pressure falls below a preset level, such pressure drop is detected by the regulator 26, which opens to allow the inert gas from the source 23 to flow into the head space of the storage tank 11 through conduit 24. The inert gas continues to fill the head space until the pressure therein equals the pre-selected slight positive pressure, whereupon the regulator 26 discontinues the flow of inert gas to the storage tank 11. In this way, inert gas is introduced progressively to the storage tank as liquid gasoline is drawn progressively therefrom and a slight positive pressure is maintained in the tank at all times.

As the volume occupied by the head space increases and the volume occupied by liquid gasoline decreases in the storage tank 11, gasoline from the surface of the liquid evaporates and saturates the head space of the tank with gasoline vapor. Each time liquid gasoline is drawn from the storage tank, additional inert gas is introduced to displace the liquid gasoline and more gasoline evaporates to reestablish an equilibrium or saturation condition in the head space of the tank. Consequently, when the tank has been substantially drained, it is filled with an inert gas/gasoline vapor mixture that is rich in gasoline vapor, that contains little or no water vapor, and that preferably, but not necessarily, contains no oxygen or other trace gases.

When the tank 11 has been emptied, it typically is refilled from a gasoline tanker truck as illustrated in FIG. 2. The gasoline tanker truck 29 is seen to be coupled to deliver liquid gasoline to the storage tank 11 through a fill hose 31, which is coupled to the fill-valve 19. The tanker truck 29 is also coupled through a hose 32 to receive gas and vapor from head space of the storage tank 11 as the storage tank is refilled with liquid gasoline. Liquid gasoline this flows from the tanker truck 29 into the storage tank 11 to refill the storage tank, which forces the inert gas/gasoline vapor mixture out of the storage tank head space and into the gasoline tanker truck 29 as shown. The liquid gasoline that is drained from the tanker truck is thus displaced by the inert gas/gasoline vapor mixture as the storage tank 11 is filled from the truck.

When the tanker truck 29 has been emptied of its load of liquid gasoline and contains only a concentrated inert gas/gasoline vapor mixture from storage tanks that have been serviced, the tanker truck returns to a central processing location for processing of its vaporous contents to recover liquid gasoline therefrom. This process is illustrated in schematic form in FIG. 3.

At the processing station 32, the tanker truck 29 is coupled to be refilled with liquid gasoline from a bulk storage tank (not shown) through a fill conduit 33. The truck is also coupled to deliver its load of collected inert gas/gasoline vapor mixture through a conduit 34 to a condensation vessel 36 or other recovery system. A source of liquid nitrogen 37, or other cryogen, is coupled through a conduit 38 and valve 39 to the condensation vessel 36 adjacent to the location where vapors are introduced into the vessel from the tanker truck.

The valve 39 is adapted to open communication through the conduit 38 to inject liquid nitrogen into the vessel 36 as the vaporous mixture is introduced into the vessel. As the liquid nitrogen is injected into the vessel 36, it quickly cools the mixture from the tanker truck to a temperature sufficient to condense the gasoline vapor within the mixture but not cold enough to liquify the inert gas within the mixture. The gasoline vapor thus condenses 10 out of the mixture.

At the bottom of the vessel 36, a phase separator 39 functions to separate the liquid gasoline from the gaseous nitrogen and other inert gases and the liquid gasoline falls into a sump 41 while the gases are expelled to the atmosphere through a vent 42. From the sump 41, the recondensed liquid gasoline can be pumped by means of a pump 43 through a pipeline 41 to a remote storage location for subsequent use. Alternatively, the recovered liquid gasoline might simply be reinjected into the tanker to supplement the gasoline from the bulk storage area. In either event, gasoline vapor from the head space of on-site gasoline storage tanks is recovered and recycled into liquid gasoline that can be resold for use at a subsequent time.

Since the mixture of inert gas/gasoline vapor from the serviced storage tanks is virtually free of water vapor, elaborate systems of pre-cooling the mixture prior to recovery of the liquid gasoline to remove water vapor therefrom are not necessary. Also, the lack of water vapor eliminates the small ice crystals that typically form during operation of prior art methodologies and that clog valves and ruin pumps. In addition, valuable cryogen and valuable energy previously used in condensing or otherwise separating water vapor from the mixture is saved and can be used directly in the condensation of gasoline vapor. Finally, in instances where the inert gas used at the retail outlets contains no oxygen, the danger of accidental combustion that inevitably accompanies processing of a mixture containing both volatile fuel and oxidizer is greatly reduced. The present invention thus satisfies the objects set out above economically and efficiently.

The invention has been described herein in terms of preferred embodiments and methodologies. It will be obvious to those of skill in this art, however, that various modifications might be made to the illustrated embodiment within the scope of this invention. As previously mentioned, for example, while a chemically inert gas is preferable for injecting into the head space of gasoline storage tanks, a dried atmospheric gas mixture might also be used with comparable results. Also, while a cryogenic cooling technique has been illustrated as a preferred method of condensing the gasoline vapor to liquid gasoline, other available methods, such as pressurization of the mixture or pressurization in conjunction with temperature reduction, for example, might also be selected. Accordingly, any suitable method of condensing the gasoline vapor to liquid phase gasoline while leaving the inert gas in the mixture in its gaseous state, would be contemplated by the present invention.

In addition, while the methodology of this invention has been illustrated in the context of recovering gasoline, it obviously is not limited to recovery of gasoline alone, but is equally adaptable to recovery of many types of fuels that are stored and delivered in ways similar to those of the illustrated embodiments. The word "gasoline" as used in the specification and claims hereof should therefore be understood to encompass other volatile fuels or solvents such as kerosene, jet fuel, and the other volatile organic compounds.

These and other modifications, additions, and deletions might well be made to the illustrated embodiments and methodologies without departing from the spirit and scope of the invention as set forth in the claims.

We claim:

1. In a gasoline distribution network wherein gasoline is drawn from a gasoline storage tank and pumped into individual vehicles and wherein the gasoline storage tank is refilled periodically from a gasoline tanker truck, a method of recovering liquid gasoline from gasoline vapor that collects in the headspace of the gasoline storage tank as the liquid gasoline is drawn therefrom, said method comprising the steps of:
   (a) providing a source of inert gas;
   (b) introducing inert gas into the gasoline storage tank as liquid gasoline is drawn therefrom so that liquid gasoline drawn from the tank is displaced by inert gas and gasoline vapor mixes with the inert gas in the headspace of the tank;
   (c) collecting the inert gas/gasoline vapor mixture from the headspace of the gasoline storage tank as the tank is refilled from a gasoline tanker truck;
   (d) cooling the inert gas/gasoline vapor mixture to a temperature sufficient to condense the gasoline vapor in the mixture to liquid gasoline but not sufficient to liquify the inert gas in the mixture;
   (e) separating the condensed liquid gasoline from the inert gas; and
   (f) delivering the condensed liquid gasoline to a remote location for subsequent use.

2. A method of recovering liquid gasoline as claimed in claim 1 and wherein the inert gas is nitrogen gas.

3. A method of recovering liquid gasoline as claimed in claim 1 and wherein step (b) comprises detecting a pressure drop in the headspace of the gasoline storage tank and injecting inert gas into the storage tank in response to such detection.

4. A method of recovering liquid gasoline as claimed in claim 3 and wherein the inert gas is injected into the storage tank until the pressure in the headspace of the tank reaches a predetermined value above atmospheric pressure whereupon injection of inert gas is ceased, whereby pressure in the headspace of the gasoline storage tank in maintained at a predetermined value above atmospheric pressure.

5. A method of recovering liquid gasoline as claimed in claim 1 and wherein step (a) comprises providing at least one pressurized tank of liquified inert gas.

6. A method of recovering liquid gasoline as claimed in claim 1 and wherein step (a) comprises providing at least one tank of inert gas in its gaseous state.

7. A method of recovering liquid gasoline as claimed in claim and wherein step (a) comprises providing means for generating inert gas for delivery to the gasoline storage tank.

8. A method of recovering liquid gasoline as claimed in claim 1 and wherein step (d) comprises introducing the inert gas/gasoline vapor mixture into a condensing vessel and injecting a cryogen into the condensing vessel to cool the mixture and condense the gasoline vapor to liquid gasoline.

9. A method of recovering liquid gasoline as claimed in claim 8 and wherein the cryogen is liquid nitrogen.

10. A method of recovering liquid gasoline as claimed in claim 1 and wherein step (d) further comprises pressurizing the inert gas/gasoline vapor mixture in conjunction with cooling the mixture.

11. A process for recycling gasoline vapor that collects in the headspace of a gasoline storage tank as liquid gasoline is drawn progressively from the tank, said process comprising sealing the storage tank against ingress of atmospheric gasses, introducing an inert gas into the headspace of the storage tank as liquid gasoline is drawn from the tank to displace the withdrawn liquid gasoline with the inert gas and to establish an inert gas/gasoline vapor mixture in the headspace of the tank, periodically recovering the inert gas/gasoline vapor mixture from the gasoline storage tank, transporting the recovered mixture to a processing site, introducing the recovered mixture into a condensing vessel, condensing the gasoline vapor to liquid gasoline within the vessel, and removing the condensed liquid gasoline from the vessel for use.

12. The process of claim 11 and wherein the step of periodically recovering the inert gas/gasoline vapor mixture from the gasoline storage tank comprises refilling the tank with liquid gasoline to displace the inert gas/gasoline vapor mixture with liquid gasoline and directing the displaced inert gas/gasoline vapor mixture to a storage vessel for transport to the processing site.

13. The process of claim 11 and wherein the step of introducing a selected inert gas into the headspace of the storage tank as liquid gasoline is drawn from the tank comprises detecting a pressure drop within the headspace of the tank upon extraction of liquid gasoline therefrom and injecting the inert gas into the tank in response to such detection.

14. The process of claim 13 and further comprising the step of monitoring the pressure within the headspace of the gasoline storage tank as the inert gas is introduced thereto and discontinuing injection of inert gas when the pressure within the headspace reaches a predetermined value above atmospheric pressure.

15. The process of claim 11 and wherein the step of condensing the gasoline vapor within the vessel comprises cooling the inert gas/gasoline vapor mixture to a temperature sufficient to condense the gasoline vapor to liquid gasoline but not sufficient to liquify the inert gas in the mixture.

16. The process of claim 15 and further comprising the step of separating the condensed liquid gasoline from the inert gas prior to recovering the condensed liquid gasoline for use.

17. The process of claim 11 and wherein the inert gas is nitrogen.

* * * * *